(12) United States Patent
Chiang (10) Patent No.: US 7,021,997 B1
(45) Date of Patent: Apr. 4, 2006

(54) MULTIFUNCTIONAL WHETSTONE

(76) Inventor: Wen Yueh Chiang, No. 266, Wu-Fu West Rd., Wu-Fu Village, Wu-Feng Hsiang, Taichung Hsien (TW)

( * ) Notice: Subject to any disclaimer, the term of this patent is extended or adjusted under 35 U.S.C. 154(b) by 0 days.

(21) Appl. No.: 11/139,807

(22) Filed: May 27, 2005

(51) Int. Cl.
*B24B 1/00* (2006.01)

(52) U.S. Cl. .............. 451/57; 451/56; 451/63; 451/119; 451/540

(58) Field of Classification Search .......... 451/28, 451/56, 57, 63, 119, 158, 162, 164, 168, 177, 451/296, 540
See application file for complete search history.

(56) References Cited

U.S. PATENT DOCUMENTS

| | | | | |
|---|---|---|---|---|
| 5,800,578 | A * | 9/1998 | Johnson | 55/302 |
| 6,406,505 | B1 * | 6/2002 | Oh et al. | 55/337 |
| 6,626,984 | B1 * | 9/2003 | Taylor | 96/380 |
| 6,766,558 | B1 * | 7/2004 | Matsumoto et al. | 15/353 |

* cited by examiner

*Primary Examiner*—Lee D. Wilson
*Assistant Examiner*—Anthony Ojini
(74) *Attorney, Agent, or Firm*—Pro-Techtor Int'l Services (57) ABSTRACT

Provided is a multifunctional whetstone comprising a handle comprising a rear cutter, top slits of different width, and a bottom magnet; a head comprising an open mouth including a curved recess for gripping a sheet of paper and a bottom opening with two concealed abrasive blades anchored in both sides; and a yoke-shaped guide fastened at the cavity and both eyes and comprising two wings. In one operation blunt cutting edges of a blade of a knife are placed in the opening and are adapted to rub against either abrasive blade to-and-fro repeatedly. In another operation a piece of glass is cut along a predetermined line by manipulating the cutter, a portion of the glass is inserted into one conformed slit with the predetermined line aligned with an opening of the slit, and the handle is adapted to pivot to break the glass into two parts.

1 Claim, 10 Drawing Sheets

MULTIFUNCTIONAL WHETSTONE

BACKGROUND OF THE INVENTION

1. Field of Invention

The present invention relates to whetstones and more particularly to a fish-shaped multifunctional whetstone.

2. Related Art

Figure 9:
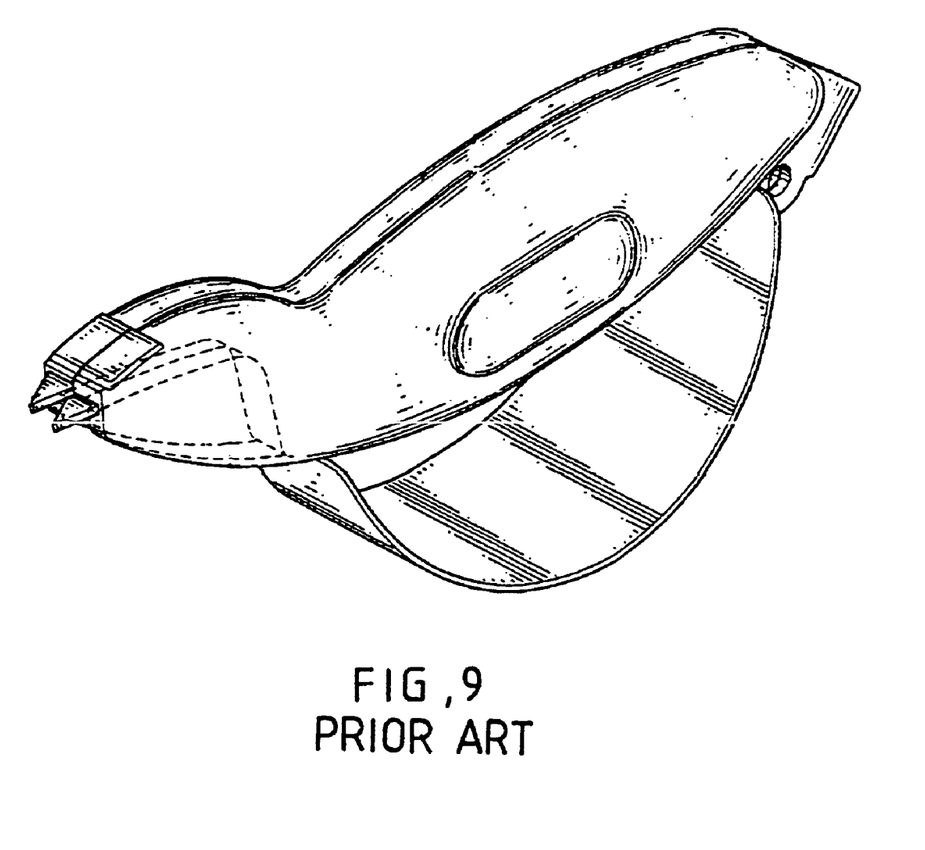
FIG. 9 is a perspective view of a conventional whetstone.
Figure 10:
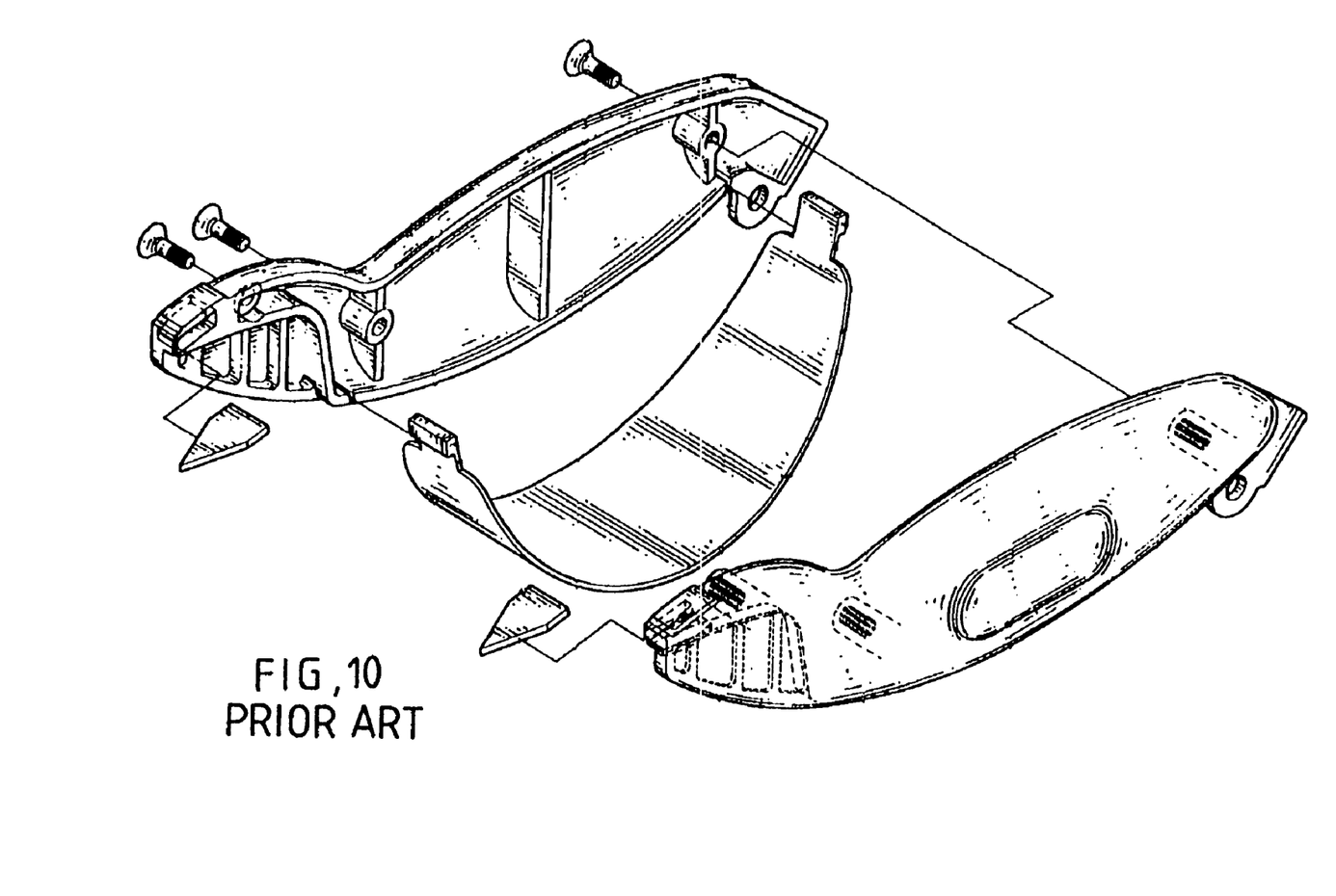
FIG. 10 is an exploded view of the whetstone in FIG. 9.

A knife may become blunt after a period time of use. Thus, it is required to sharpen the blunt knife. There have been numerous suggestions in prior art for whetstones. For example, a well known whetstone is shown in perspective and exploded views in FIGS. 9 and 10 respectively. It describes a handle consisting of two shells threadedly secured together, a forward extension of the handle having a slot for receiving two abrasive blades side by side, and an arcuate guard provided under the handle. In use, a user may grasp the handle with one hand and place a blunt knife between the abrasive blades for sharpening to-and-fro repeatedly.

However, the prior art suffered from several disadvantages. For example, the abrasive blades are exposed. In other words, it is not safe in use. Further, the fastening of the abrasive blades in the slot is not reliable. Furthermore, the whetstone is a single function one, resulting in a limitation of its applications. Moreover, the blunt knife faces the hand grasping the handle in use. Thus, the hand may be hurt if sufficient care is not taken. Hence, a need has arisen for an improved and multifunctional whetstone.

SUMMARY OF THE INVENTION

It is therefore an object of the present invention to provide a safe, multifunctional whetstone.

It is another object of the present invention to provide a multifunctional whetstone capable of cutting a piece of glass.

It is a further object of the present invention to provide a multifunctional whetstone capable of gripping a sheet of paper.

The above and other objects of the present invention are realized by providing a whetstone having a fish shape comprising a handle comprising a recessed portion in its tail, a seat in the recessed portion, a disk-shaped cutter rotatably secured to the seat and having a rear portion slightly projected from the tail, a plurality of top slits having different width, and a magnet fitted in its bottom and adapted to attract a fixed member for mounting the whetstone thereon; a head consisting of a first portion integrally formed with the handle and a second portion detachably secured to the first portion, the head comprising an open mouth including a curved recess for gripping a sheet of paper, two slots each in an inner wall of either the first or the second portion, a bottom opening with the slots on its both sides, two abrasive blades anchored in the slots respectively, two projecting eyes on both sides of the head, and a top cavity proximate the handle; and a guide comprising a central yoke matingly received in the cavity, two holes on both sides of the cavity snappingly put on the eyes for fastening the guide, and two wings extended outwardly from both sides of the yoke, wherein in a first operation blunt cutting edges of a blade of a knife are placed in the opening and are adapted to rub against either abrasive blade to-and-fro repeatedly; and in a second operation a piece of glass is cut along a predetermined line by manipulating the cutter, a portion of the glass is inserted into one conformed slit with the predetermined line aligned with an opening of the slit, and the handle is adapted to pivot to break the glass into two parts.

The above and other objects, features and advantages of the present invention will become apparent from the following detailed description taken with the accompanying drawings.

DETAILED DESCRIPTION OF THE INVENTION

Figure 1:
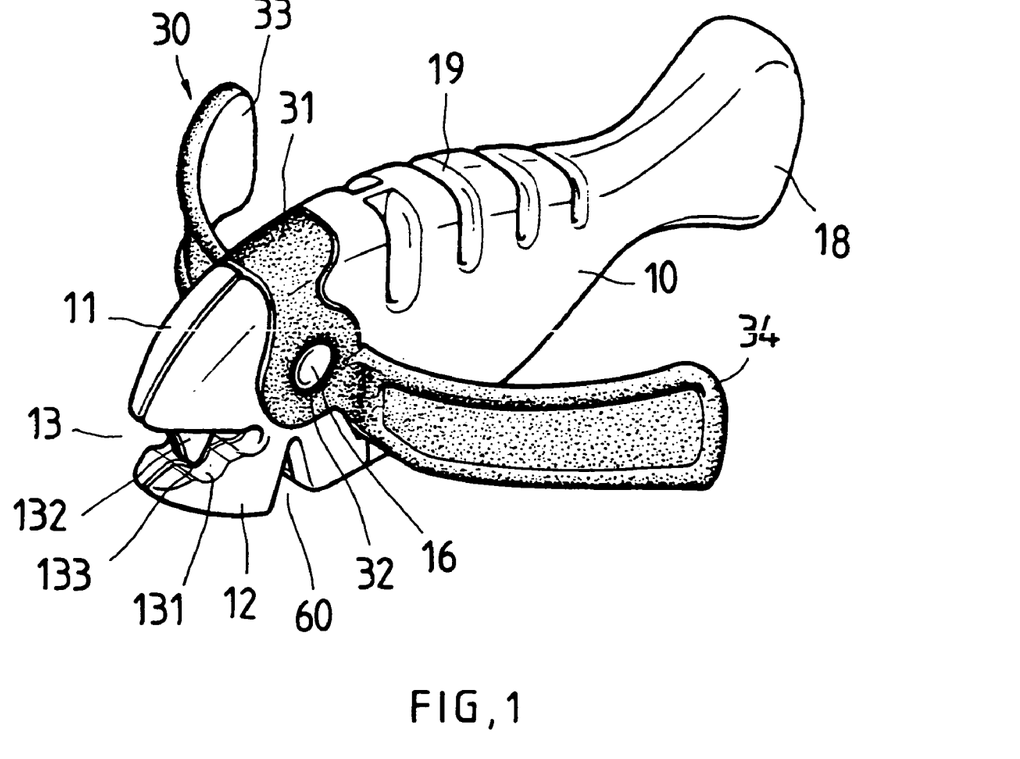
FIG. 1 is a perspective view of a preferred embodiment of multifunctional whetstone according to the invention.
Figure 2:
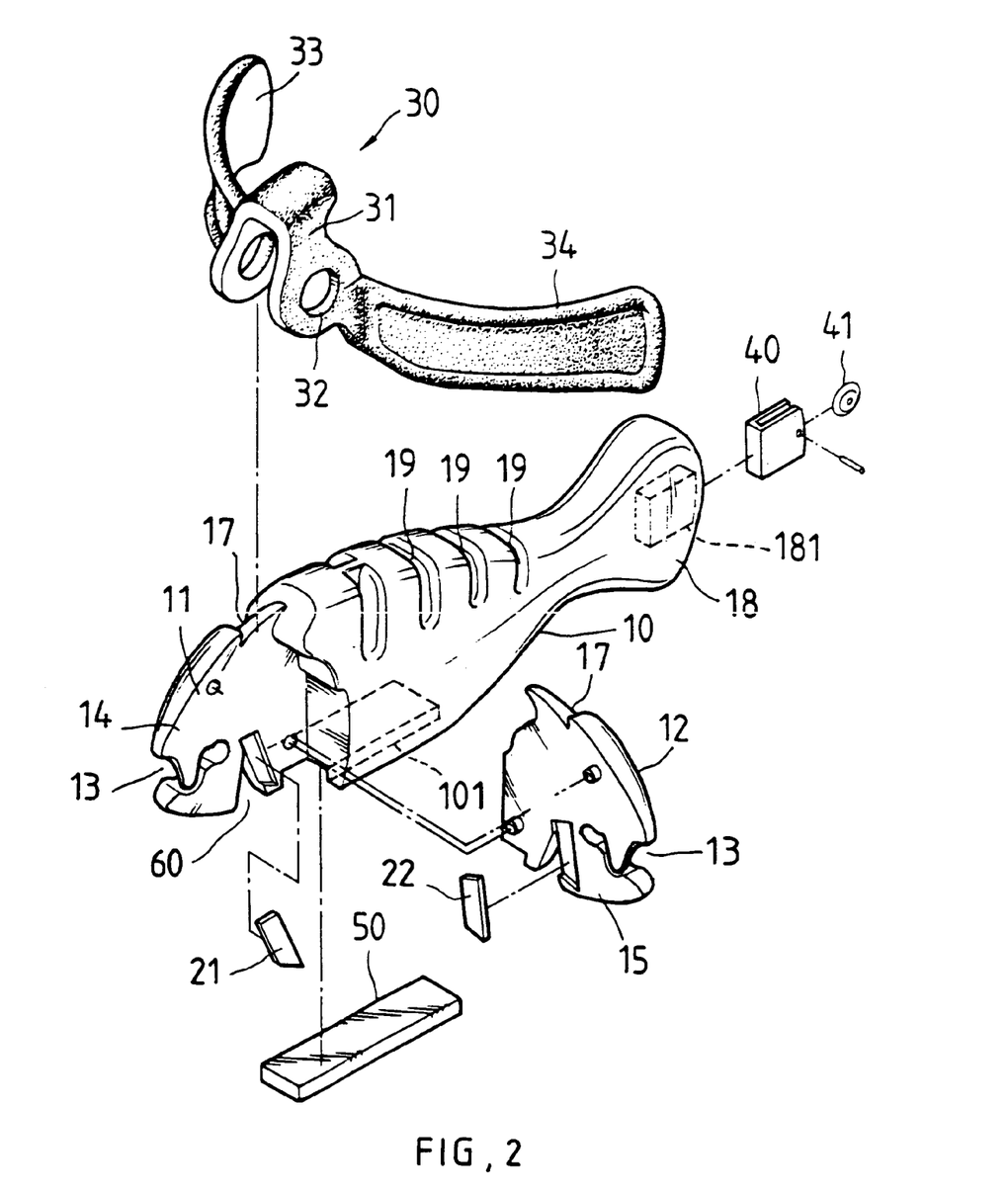
FIG. 2 is an exploded view of the assembled whetstone in FIG. 1.
Figure 3:
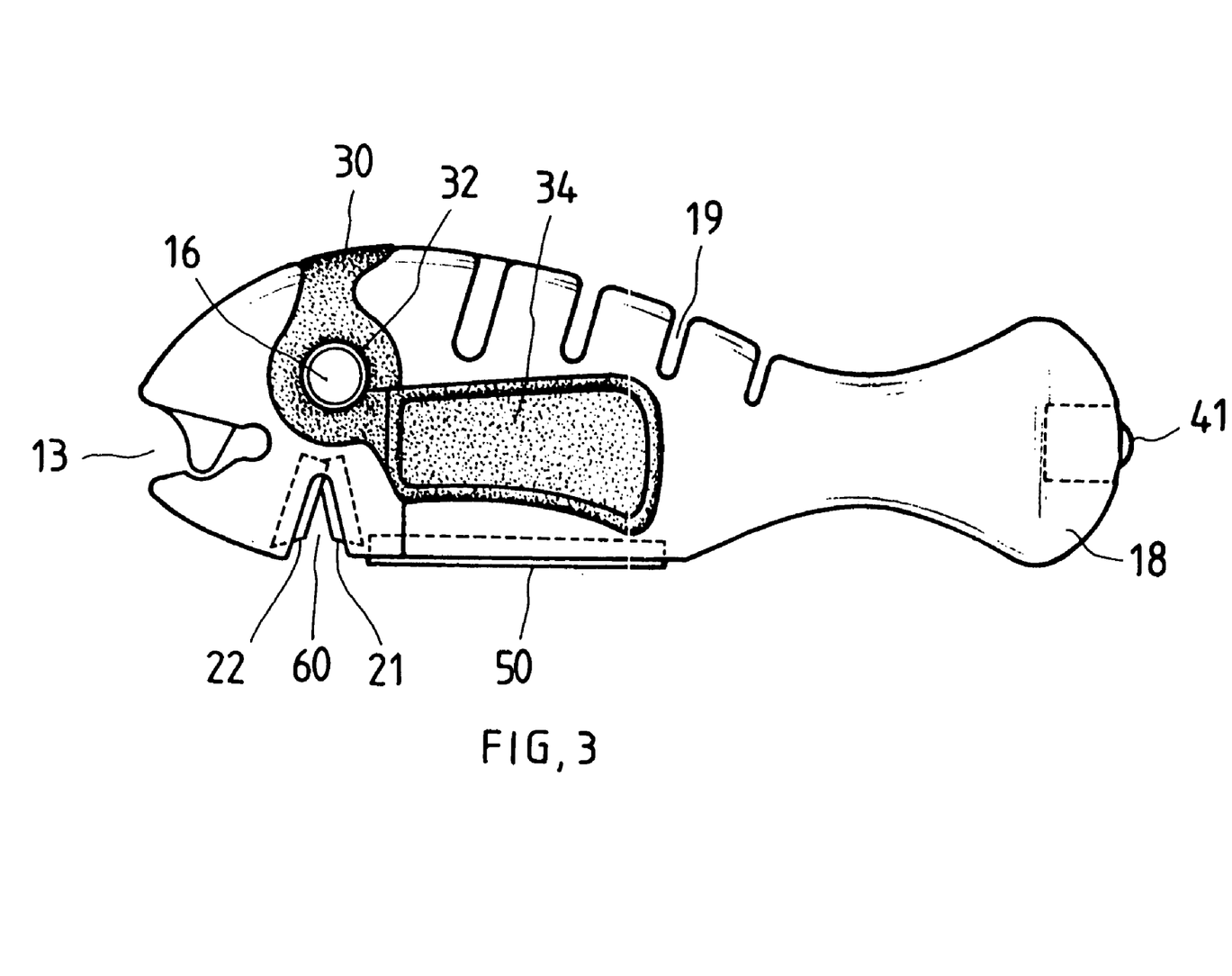
FIG. 3 is a side view of the whetstone in FIG. 1.

Referring to FIGS. 1, 2, and 3, there is shown a multifunctional whetstone constructed in accordance with a preferred embodiment of the invention. The whetstone comprises a fish-shaped handle 10; a head consisting of two parts snappingly secured together in which one is an integral extension 11 of the handle 10 and the other is a detachable member 12; an open mouth 13 formed in the head and including a curved recess 131 on its bottom, a curved projection 132 extending from its top toward the recess 131, and a gap 133 between the recess 131 and the projection 132; two slots 14 and 15 in inner walls of the extension 11 and the detachable member 12 respectively; a triangular bottom opening 60 in a joining portion of the head and the handle 10 between the slots 14 and 15; two abrasive blades 21 and 22 anchored in the slots 14 and 15 respectively; two projecting eyes 16 on both sides of the head; a top cavity 17 in a joining portion of the head and the handle 10; and a guide 30 including a central yoke 31 matingly received in the cavity 17, two holes 32 on both sides of the cavity 17 snappingly put on the eyes 16 for fastening the guide 30 at a joining portion of the head and the handle 10, and two wings 34 extended outwardly from both sides of the yoke 31. The provision of the guide 30 aims at not only protecting the hand but also increasing stability while holding the handle 10 in use.

The whetstone further comprises a tail 18 in the rear end of the handle 10, a substantially parallelepiped recessed portion 181 in the tail 18, a yoke-shaped seat 40 provided in the recessed portion 181, and a disk-shaped cutter 41 rotatably secured to the seat 40 and having a rear portion slightly projected from the tail 18. The whetstone further comprises a plurality of slits 19 on top of the handle 10 in which width of one slit 19 is different from that of any of the remaining slits 19; a substantially parallelepiped recessed portion 101 provided on bottom of the handle 10 proximate the opening 60; and a magnet 50 fitted in the recessed portion 101 and slightly projected from bottom of the handle 10.

Figure 4:
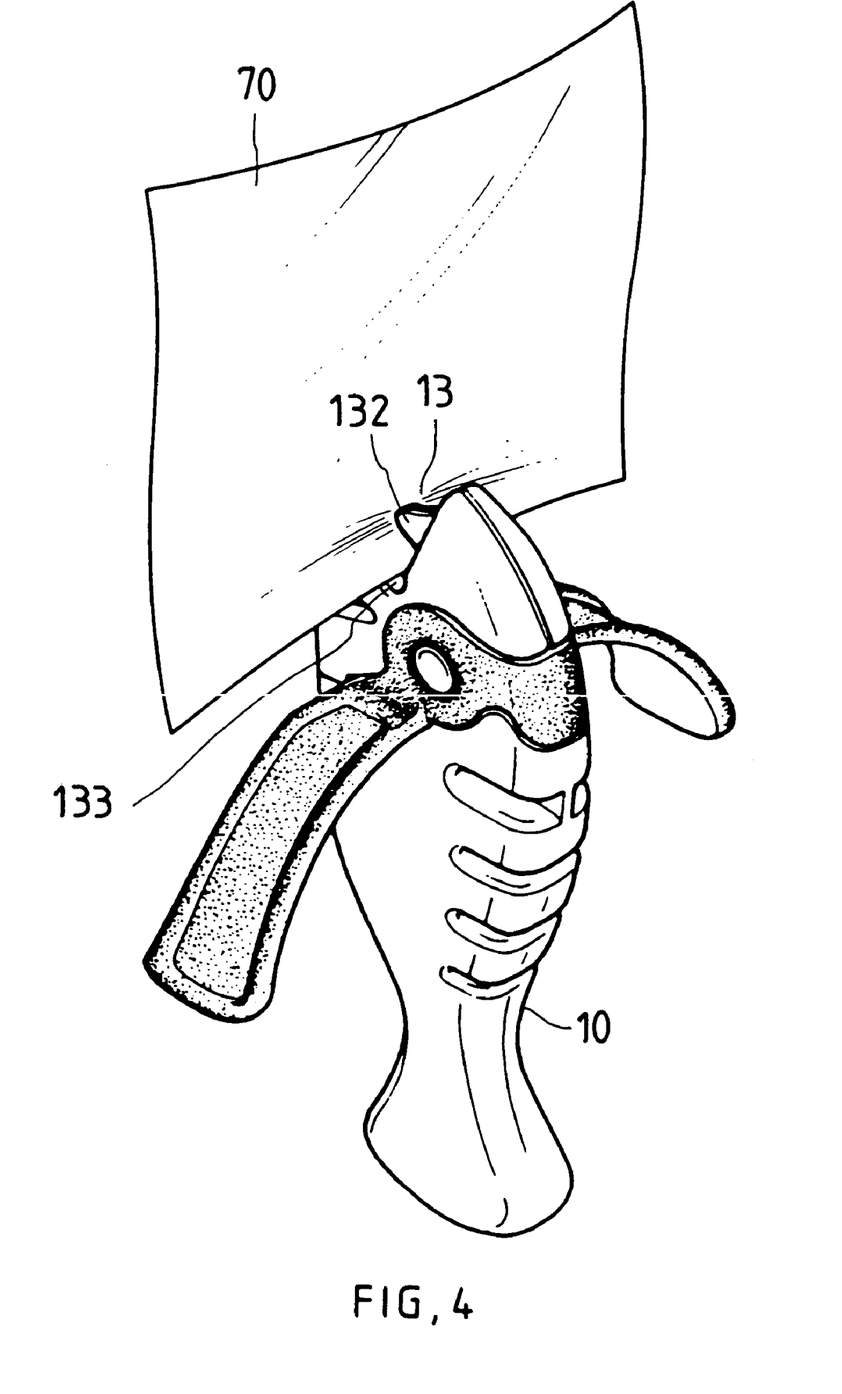
FIGS. 4 to 8 are perspective views of the whetstone in FIG. 1 showing its four different applications.

Referring to FIGS. 4 to 8, applications of the whetstone of the invention are illustrated below. In FIG. 4, a sheet of paper 70 is gripped in the gap 133 by the recess 131 and the projection 132 (i.e., firmly held in the mouth 13). This application assumes that the whetstone has been secured by, for example attracting to a fixed member by the magnet 50 as detailed later.

Figure 5:
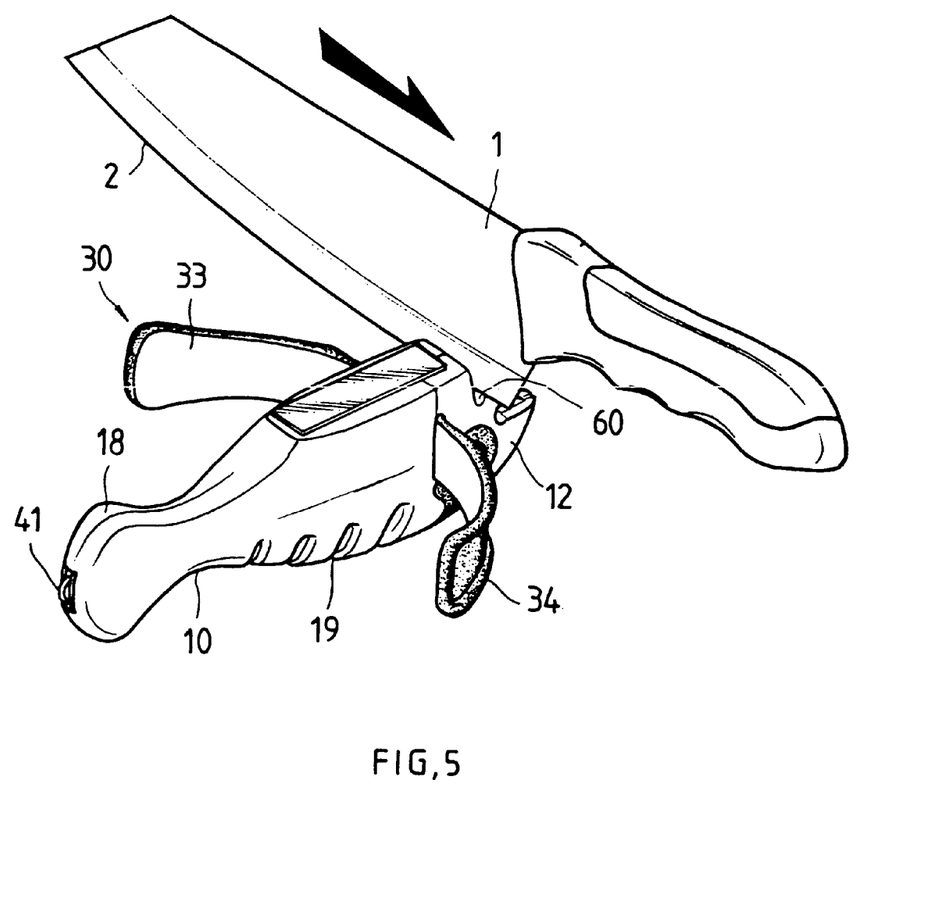

In FIG. 5, blunt cutting edges 2 of blade 1 of a knife are placed in the opening 60 and are rubbed against either abrasive blade 21 or 22 to-and-fro repeatedly until the cutting edges 2 are sharpened. The sharpening operation is safe since the guide 30 is disposed between the hand grasping the handle 10 and the blunt knife (i.e., the hand and the knife are spaced apart sufficiently) with both the abrasive blade 21 and 22 concealed.

Figure 6:
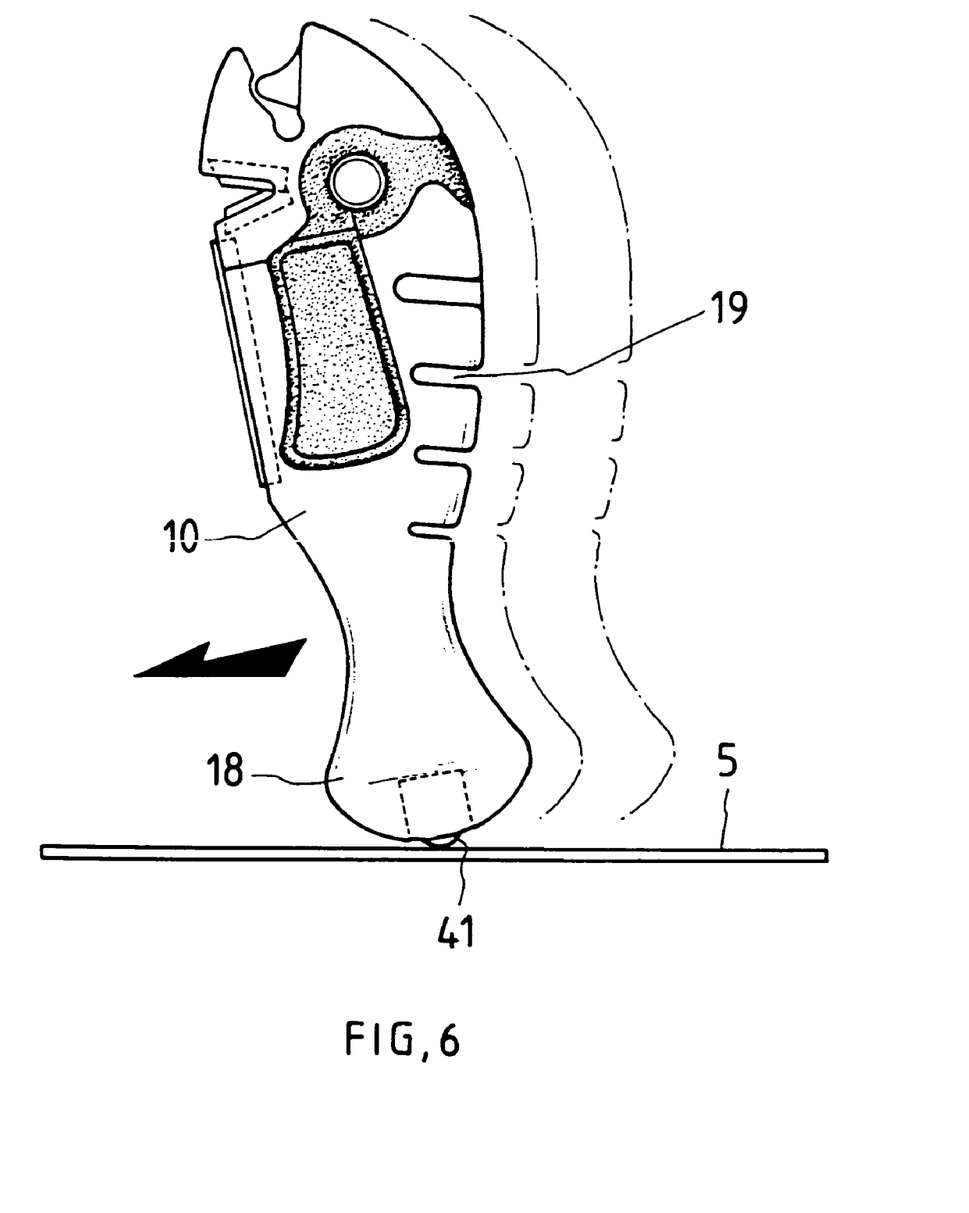
Figure 7:
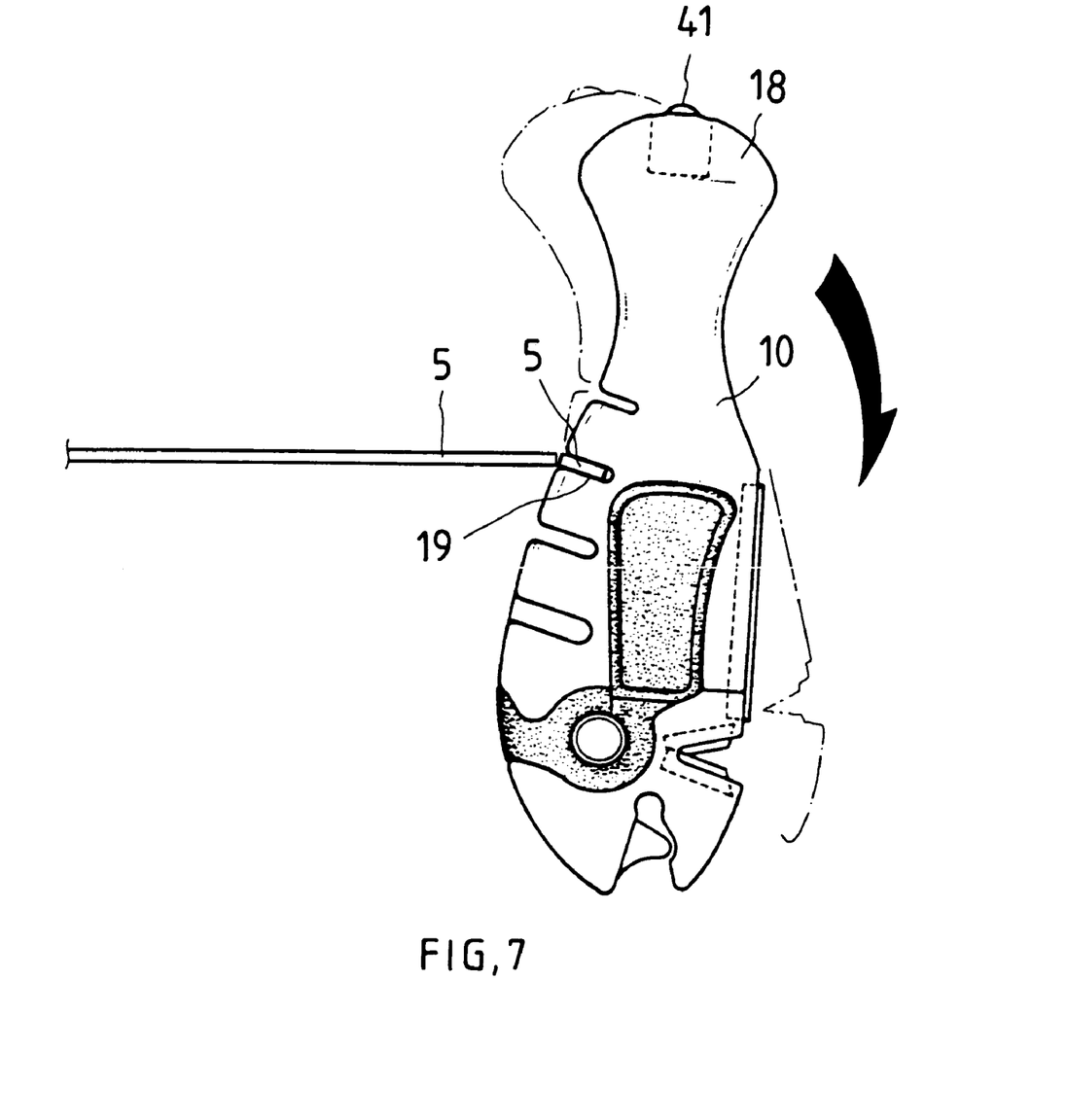

In FIG. 6, a user may hold the handle 10 perpendicularly with respect to a piece of glass 5 and then cut a sufficient depth on the glass 5 along a desired line by means of the cutter 41. In FIG. 7, the user may then insert a portion of the glass 5 into one slit 19 having a width conformed to that of the glass 5 and align the cut line of the glass 5 with the opening of the slit 19. Next, pivot the handle 10 to break the glass 5 into two parts.

Figure 8:
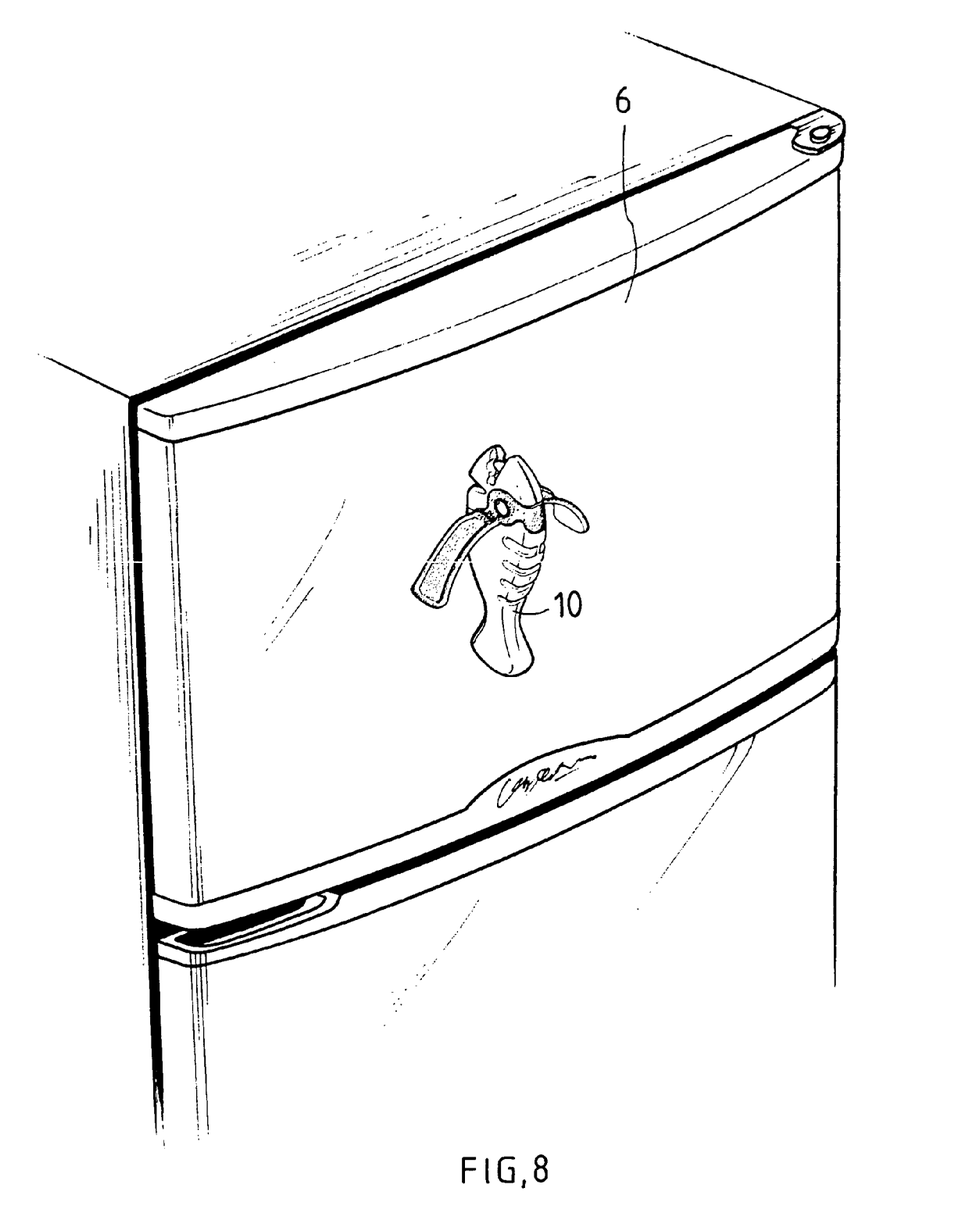

In FIG. 8, the whetstone may be placed on a fixed object (e.g., refrigerator 6 as shown) by attracting the handle 10 to a door of the refrigerator 6 by the magnet 50 in a nonoperating state. This application is somewhat aesthetic since the whetstone has a fish shape.

While the invention herein disclosed has been described by means of specific embodiments, numerous modifications and variations could be made thereto by those skilled in the art without departing from the scope and spirit of the invention set forth in the claims.

What is claimed is:

1. A whetstone having a fish shape comprising:
a handle comprising a recessed portion in its tail, a seat in the recessed portion, a disk-shaped cutter rotatably secured to the seat and having a rear portion slightly projected from the tail, a plurality of top slits having different width, and a magnet fitted in its bottom and adapted to attract a fixed member for mounting the whetstone thereon;

a head consisting of a first portion integrally formed with the handle and a second portion detachably secured to the first portion, the head comprising an open mouth including a curved recess for gripping a sheet of paper, two slots each in an inner wall of either the first or the second portion, a bottom opening with the slots on its both sides, two abrasive blades anchored in the slots respectively, two projecting eyes on both sides of the head, and a top cavity proximate the handle; and a guide comprising a central yoke matingly received in the cavity, two holes on both sides of the cavity snappingly put on the eyes for fastening the guide, and two wings extended outwardly from both sides of the yoke, wherein:

in a first operation blunt cutting edges of a blade of a knife are placed in the opening and are adapted to rub against either abrasive blade to-and-fro repeatedly; and in a second operation a piece of glass is cut along a predetermined line by manipulating the cutter, a portion of the glass is inserted into one conformed slit with the predetermined line aligned with an opening of the slit, and the handle is adapted to pivot to break the glass into two parts.

* * * * *